US006410772B2

(12) United States Patent
Okuyama et al.

(10) Patent No.: US 6,410,772 B2
(45) Date of Patent: Jun. 25, 2002

(54) CONTINUOUS HYDROSILYLATION METHOD FOR PRODUCTION OF A MODIFIED LIQUID ORGANOSILICON COMPOUND

(75) Inventors: Toshio Okuyama, Midland, MI (US); Naoya Matsui; Takao Takemasa, both of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/780,074

(22) Filed: Feb. 9, 2001

(30) Foreign Application Priority Data

Apr. 13, 2000 (JP) ........................................ 2000-112462

(51) Int. Cl.[7] .................................................. C07F 7/08
(52) U.S. Cl. ...................................................... 556/479
(58) Field of Search ......................................... 556/479

(56) References Cited

U.S. PATENT DOCUMENTS

| 4,276,426 | A | * | 6/1981 | Lindner et al. | ............. 556/479 |
| 4,454,331 | A | * | 6/1984 | Zeller et al. | ............ 556/479 X |
| 4,898,961 | A | * | 2/1990 | Baile et al. | ................. 556/479 |
| 6,015,920 | A | * | 1/2000 | Schilling et al. | ............ 556/479 |

* cited by examiner

*Primary Examiner*—Paul F. Shaver
(74) *Attorney, Agent, or Firm*—Charles R. Richard

(57) ABSTRACT

A continuous method for performing a hydrosilylation reaction comprising effecting a hydrosilylation reaction between a liquid organosilicon compound (A) having in each molecule at least one silicon-bonded hydrogen atom and a liquid organosilicon compound (B) having in each molecule at least one aliphatic unsaturated bond in the presence of a platinum catalyst (C) continuously in a tubular reactor equipped with a stirring and plug-flow maintaining apparatus located within the reactor.

15 Claims, 2 Drawing Sheets

CONTINUOUS HYDROSILYLATION METHOD FOR PRODUCTION OF A MODIFIED LIQUID ORGANOSILICON COMPOUND

FIELD OF THE INVENTION

The present invention relates to a method for performing a continuous hydrosilylation reaction in a tubular reactor equipped with a stirring and plug-flow maintaining apparatus located within the reactor. The invention also relates to a method for continuous production of a modified liquid organosilicon compound.

BACKGROUND OF THE INVENTION

Hydrosilylation reactions conducted in the presence of a platinum catalyst between a liquid organic compound having in each molecule at least one aliphatic unsaturated bond and a liquid organosilicon compound having in each molecule at least one silicon-bonded hydrogen atom (hereinafter referred to as SiH) are normally carried out in a batch fashion in a compatible solvent (such as ethyl alcohol, isopropyl alcohol, or a similar alcohol; or benzene, toluene, xylene, or a similar aromatic solvent). It is normally required for the above reaction that the mole ratio of the aliphatic unsaturated bonds to SiH be greater than 1 and that the coefficient of conversion (1−{(amount of residual SiH)/(amount of SiH prior to the reaction)}) be greater than 0.9999. In order to satisfy such requirements, the reaction often took an extremely long time.

Furthermore it is also known that the aforementioned hydrosilylation reaction is an exothermic reaction of about 40 kcal for 1 mole of SiH, and in order to prevent thermal degradation of organic groups and to maintain safety in the process, it is necessary to control the reaction temperature. Dilution with an organic solvent is often used in a batch-type production system for removal of the reaction heat. Since the use of such a solvent presents a danger from the point of view of fire or explosion, special measures have to be undertaken for the removal of the organic solvent after completion of the reaction. This decreases the efficiency of the process as a whole. It is also possible to control an increase in the reaction temperature caused by the reaction heat by dripping either a SiH-containing liquid organosilicon or a liquid organosilicon that contains aliphatic bonds to a mixture of the other of the above organosilicons containing a platinum catalyst. Such a method, however, significantly prolongs the reaction time. It has been proposed recently to conduct the hydrosilylation reaction in a tank-type reactor and then to complete the reaction by feeding the crude product to a plug-flow reactor. Such a method, however, does not solve the problems of the prior art since the process remains essentially a batch-type process.

It is an object of the present invention to provide a method for performing a hydrosilylation reaction in a speedy and efficient way without recourse to dilution with organic solvents, and without the use of a tank-type reactor. It is another object to provide a method for continuous production of a modified liquid organosilicon.

SUMMARY OF INVENTION

The present invention is a continuous method for performing a hydrosilylation reaction. The method comprises effecting a hydrosilylation reaction between a liquid organosilicon compound (A) having in each molecule at least one silicon-bonded hydrogen atom and a liquid organosilicon compound (B) having in each molecule at least one aliphatic unsaturated bond in the presence of a platinum catalyst (C) continuously in a tubular reactor equipped with a stirring and plug-flow maintaining apparatus located within the reactor. The invention also comprises a method for continuous production of a modified liquid organosilicon compound.

Figure 1:
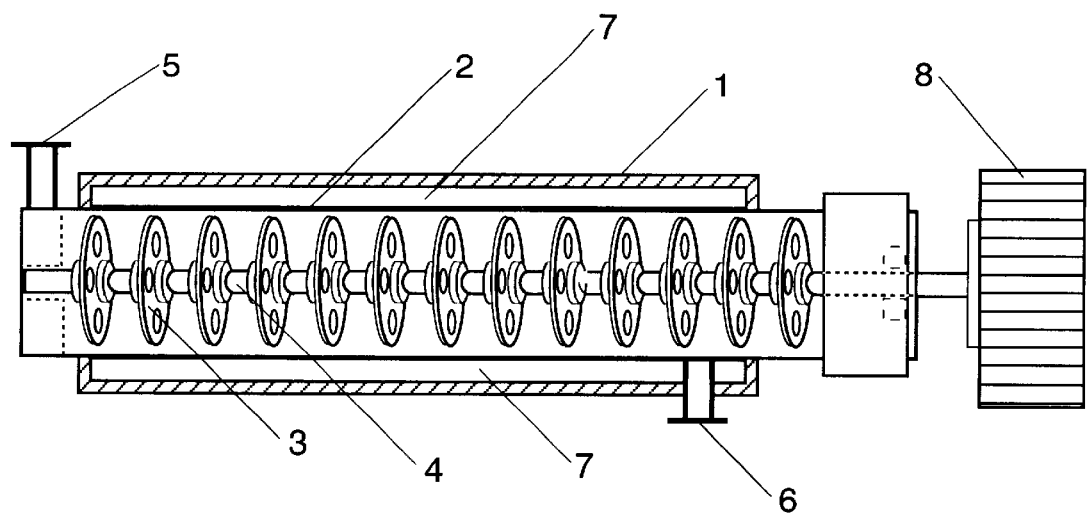
FIG. 1 is schematic view of tubular reactor 1 used in practical examples of the invention.

Reference numerals used in the description:
1. tubular reactor
2. cylinder portion
3. disk
4. rotary shaft
5. raw-material loading port
6. unloading port
7. jacket
8. motor
9. perforations
10. cutouts
11. opening for the rotary shaft
12, 13, 14. feed pump
15, 16. heating-type heat exchanger
17. premixer
18. motor
19. receiving container
20. static reactor

DESCRIPTION OF THE INVENTION

The present invention is a continuous method for performing a hydrosilylation reaction. The method comprises effecting a hydrosilylation reaction between a liquid organosilicon compound (A) having in each molecule at least one silicon-bonded hydrogen atom and a liquid organosilicon compound (B) having in each molecule at least one aliphatic unsaturated bond in the presence of a platinum catalyst (C) continuously in a tubular reactor equipped with a stirring and plug-flow maintaining apparatus located within the reactor. The invention also comprises a method for continuous production of a modified liquid organosilicon compound by effecting a hydrosilylation reaction between a liquid organosilicon compound (A) having in one molecule at least one silicon-bonded hydrogen atom and a liquid organosilicon compound (B) having in one molecule at least one aliphatic unsaturated bond in the presence of a platinum catalyst (C) continuously in a tubular reactor equipped with a stirring and plug-flow maintaining apparatus located within the reactor.

The present invention is characterized by a continuous hydrosilylation reaction conducted in a tubular reactor equipped with a stirring and plug-flow maintaining apparatus. An example of a typical tubular reactor of the aforementioned type is shown in FIG. 1. It is known that, in general, a stirrer can be of a blade or a pin type and due to the high speed of rotation, stirrers of these types mix components in a relatively short period of time. It has been observed, however, that when such stirrers are used in conjunction with tubular reactors, they significantly impair plug-flow conditions resulting in incomplete reaction of SiH.

However, with the present invention the hydrosilylation reaction is carried out continuously in a tubular reactor equipped with a stirrer and plug-flow maintaining apparatus located within the reactor, and therefore it is possible, simultaneously with the stirring action provided by shearing, to ensure high plug-flow properties. This allows for reducing the hydrosilylation-reaction time, and if an average residence time is chosen so that it slightly exceeds the time required for completion of the reaction, it becomes possible to obtain the target reaction product with a reaction conversion rate greater than 99.99%.

Figure 2:
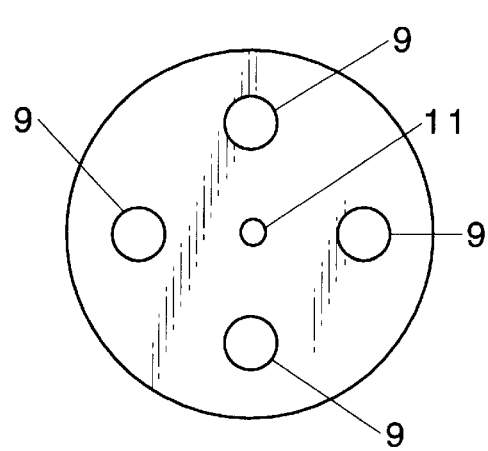
FIG. 2 is a side view of disk 3 used in tubular reactor 1.
Figure 3:
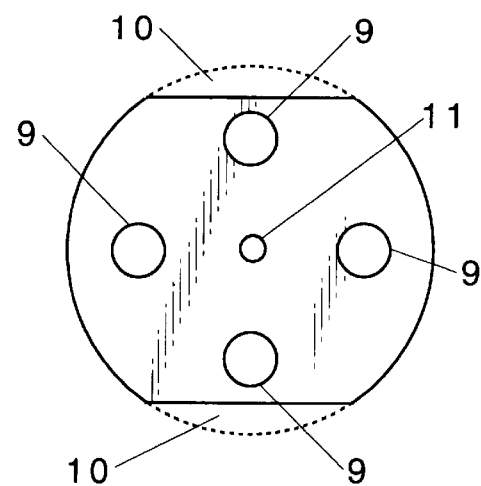
FIG. 3 a side view of another embodiment of disk 3 used in tubular reactor 1.

When the tubular reactor has a cylindrical shape, it is preferable to have disks of a circular cross section. However, in order to maintain a through flow, each disk should have at least one perforation or a cutout on its periphery. Horizontal orientation of the reactor with cutouts in the disks facilitates removal of air bubbles accumulated in the reactor. Typical disk configurations are shown in FIGS. 2 and 3. If the disks are too small, there is a risk of loosing plug-flow properties. Therefore, the cross-sectional areas of the disks should be at least 10%, and preferably, at least 50%, of the cross-sectional area of the tubular reactor. The greater the number of disks, the better the plug-flow maintaining conditions. Therefore, the disks should be used in an amount of 2 or more. The reactor may have a vertical, horizontal, or inclined orientation. The optimal orientation of the reactor is selected with reference to the specific reactor layout.

For efficient removal of hydrosilylation-reaction heat, the tubular reactor can be surrounded by a cooling jacket capable of passing through it a cooling medium. It is known that the amount of exothermic heat produced by a hydrosilylation reaction is equal to about 40 kcal for 1 mole of SiH reacted. In order to prevent thermal decomposition of organic groups and to ensure safety of the process, removal of heat by means of the cooling jacket should be provided with temperature control.

The use of the aforementioned tubular reactor alone is sufficient for conducting a hydrosilylation reaction, but if necessary the reactor can be combined with a premixer installed upstream of the reactor. For example, the following components can be premixed in a premixer (such as, e.g., a dynamic mixer): a liquid organosilicon (A), having in one molecule at least one silicon-bonded hydrogen atom and a liquid organic compound (B) having in one molecule at least one aliphatic unsaturated bond; or a liquid organosilicon (A), having in one molecule at least one silicon-bonded hydrogen atom, a liquid organic compound (B), having in one molecule at least one aliphatic unsaturated bond, and a platinum catalyst (C). If the components are premixed to a sufficient extent in the above manner and are supplied to the tubular reactor in a mixed state for performing the hydrosilylation reaction, the reactor capacity can be significantly improved. A dynamic mixer of any type capable of efficiently mixing the aforementioned two or three components in a short period of time is suitable for the process of the invention. If the frequency of rotation of the disks is low, the rate of separation of non-reacted parts of the components (A) and (B) during the hydrosilylation reaction is increased, and, as a result, it becomes impossible to reach a coefficient of conversion exceeding 99.99%. Moreover, the product is whitened. Although selection of the actual speed of rotation of the disks depends on the inner diameter of the tubular reactor, in general, it is recommended that this speed be within a range of 10 to 2000 rpm, preferably between 100 and 500 rpm. Furthermore, a static reactor can be installed in a downstream position of the tubular reactor. As the flow rate of the supply of components (A) and (B) to the tubular reactor is increased, the length of the tubular reactor has to be increased as well. However, installation of a static reactor in a position downstream of the tubular reactor makes such elongation of the tubular reactor unnecessary. For controlling the temperature of the static reactor, it can be enclosed in a cooling jacket, which allows the passage of a liquid coolant.

When component (A) is a lipophilic substance such as an organohydrogenpolysiloxane and component (B) is a hydrophilic substance such as an alkenyl-group capped polyoxyalkylene, (i.e., when the components (A) and (B) are not miscible), the reaction process may have the highest efficiency if it is conducted in the aforementioned tubular reactor. Rotation of the disks facilitates mixing of the various components and thus may improve efficiency of the reaction while maintaining plug-flow conditions. This increased efficiency may allow the decreasing the overall dimensions of the reactor.

There are no special limitations with regard to component (A) except that it must have at least one silicon-bonded hydrogen atom and should remain liquid at the reaction temperature. Component (A) can be used in the form of a monomer, oligomer, or polymer. The oligomer may be an organosiloxane oligomer with SiH in its molecule, or an organosilicon oligomer with SiH in its molecule, as well as an organic oligomer with SiH in its molecule. A polymer can be represented by an organic polymer having SiH in its molecule, an organopolysiloxane with SiH in its molecule or an organosilicon polymer with SiH in its molecule. Only one SiH group may be present in one molecule, or each silicon atom can be bonded to H, or only some of the silicon atoms may be bonded to H. It is also possible to have two hydrogen atoms bonded to the same silicon atom. The following are examples of monomers which contain SiH in their molecules: trimethylsilane, dimethylphenylsilane, dimethylethoxysilane, or a similar organohydrogensilane. The following are examples of organosiloxanes which have SiH in their molecules: hydrogensilsesquioxane oligomer, organooligosiloxanes having SiH in its molecule such as pentamethyldisiloxane, trimethyldisiloxane, hexamethyltrisiloxane, a methylhydrogensiloxane trimer having both terminals capped with trimethylsiloxy groups, tetramethylcyclotetrasiloxane, $CH_3Si(O(CH_3)_2SiH)_3$, $HSi(CH_3)_2OSi(OCH_3)_3$, and $Si(OSi(CH_3)_2H)_4$. The organopolysiloxane having SiH in its molecule can be represented by hydrogenpolysilsesquioxane. The organopolysiloxane having SiH in its molecule can be represented by the following compounds: methylhydrogenpolysiloxane having both molecular terminals capped with trimethylsiloxy groups, a copolymer of dimethylsiloxane and methylhydrogensiloxane having both molecular terminals capped with trimethylsiloxy groups, methylhydrogenpolysiloxane consisting of $H(CH_3)_2SiO_{1/2}$ units and $SiO_{4/2}$ units, methylhydrogenpolysiloxane having both molecular terminals capped with dimethylphenylsiloxy groups, and dimethylpolysiloxane having both molecular terminals capped with dimethylhydrogensiloxy groups.

There are no special limitations with regard to component (B) except that it must have at least one aliphatic unsaturated bond in each molecule and should be in a liquid state at the reaction temperature. This compound can be represented by a monomer, oligomer or a polymer. The oligomer can be an organooligosiloxane with aliphatic unsaturated bonds in its molecule, an organic oligomer with aliphatic unsaturated bonds in its molecule, or an organosilicon oligomer with aliphatic unsaturated bonds in its molecule. The polymer can be represented by an organopolysiloxane also with aliphatic unsaturated bonds in its molecule, or by an organic polymer with aliphatic unsaturated bonds in the molecule as well as by an organosilicon polymer with unsaturated bonds in the molecule. The aforementioned polymers may have a linear, branched, cyclic, or resin-like molecular structure. The aliphatic unsaturated bonds can be located at the chain terminals, pendant, or in a combination of both locations.

The aforementioned aliphatic unsaturated bonds can be exemplified by ethylene bonds and acetylene bonds. The following are examples of monomer and organic oligomer compounds with aliphatic unsaturated bonds in their molecules: 1-hexene, 1-octene, 1-decene, 1-dodecene, 1,6-hexanediene, 1,8-octanediene, cyclohexene, allylglycidyl ether, acrylic acid, methacrylic acid, methylacrylate, methylmethacrylate, and ethylmethacrylate. The following are examples of organic polymers with aliphatic unsaturated bonds in their molecules: polybutadiene, polyisobutylene, polyoxyethylene having one terminal capped with an allyl group, polyoxypropylene having one terminal capped with an allyl group, an oxyethylene-oxypropylene copolymer with one terminal capped with an allyl group, polyoxyethylene with both molecular terminals capped with allyl groups, polyoxypropylene with both molecular terminals capped with allyl groups, unsaturated polyesters, and an alkyd resin containing vinyl groups. The organooligosiloxane with aliphatic unsaturated bonds in the molecule can be represented by the following compounds: 1,3-divinyltetramethyldisiloxane, 1,3-divinylhexamethyltrisiloxane, methylvinyloligosiloxane having both molecular terminals capped with trimethylsiloxy groups, and tetramethyltetravinylcyclotetrasiloxane. The aforementioned organopolysiloxane with aliphatic unsaturated bonds in its molecule can be represented by the following compounds: dimethylpolysiloxane having both molecular terminals capped with dimethylvinylsiloxy groups, a copolymer of methylphenylsiloxane and dimethylsiloxane having both molecular terminals capped with dimethylvinylsiloxy groups, a copolymer of methylvinylsiloxane and dimethylsiloxane having both molecular terminals capped with dimethylvinylsiloxy groups, a copolymer of methylvinylsiloxane and dimethylsiloxane having both molecular terminals capped with trimethylsiloxy groups, a copolymer of methylhexenylsiloxane and dimethylsiloxane having both molecular terminals capped with trimethylsiloxy groups, dimethylpolysiloxane having one molecular terminal capped with a dimethylvinylsiloxy group and the other terminal capped with a trimethylsiloxy group, methylvinylpolysiloxane resin composed of $CH_2$=CH ($CH_3$)$_2SiO_{1/2}$ units and $SiO_{4/2}$ units, and methylvinylpolysiloxane resin composed of $CH_2$=CH ($CH_3$) $SiO_{2/2}$ units and ($CH_3$) $SiO_{3/2}$ units.

The loading ratio of component (A) to component (B) should be about 1. If it is necessary that the reaction product contain residual SiH groups the above ratio may exceed 1, and if the presence of residual SiH groups is undesired, the ratio should be less than 1. When component (A) contains in each molecule only one SiH group, the number of aliphatic unsaturated groups in component (B) has no limitations. When two SiH groups are present in the molecule of component (A), it is recommended that the number of aliphatic unsaturated groups in each molecule of component (B) should not exceed 2. When the number of SiH groups in each molecule of component (A) is equal to or exceeds 3, it is recommended that only one aliphatic unsaturated group per molecule be present in component (B). This is because crosslinking will occur in this case if the number of unsaturated aliphatic groups is equal to or exceeds 2, thereby causing gelation of the reaction product in the tubular reactor.

The platinum catalyst supplied to the hydrosilylation reaction as component (C) can be represented by microscopic particles of platinum on a silica powder carrier, microscopic platinum particles on a carbon powder carrier, platinum black, a complex of chloroplatinic acid and 1,3-divinyltetramethyldisiloxane, a platinum-olefin complex, a platinum diketone complex, and a platinum-alkylacetoacetate complex. The amount of platinum catalyst (C) is selected with reference to the catalytic activity and the expected duration of the reaction, but in general when the reaction is carried out in a liquid the platinum (in terms of parts by weight) can be contained in an amount of 0.1 to 1000 ppm platinum, based on the weight of the reaction mixture.

Under the effect of the catalytic action of component (C), the SiH groups of component (A) and the aliphatic unsaturated groups of component (B) are hydrosilylated in the tubular reactor, and a modified liquid organosilicon compound is obtained from the tubular reactor. Depending on the type of the raw material used for components (A) and (B), the obtained modified liquid organosilicon compound may be in the form of a monomer, oligomer, or a polymer.

The invention will be further described with reference to practical examples. In the examples, all parts are parts by weight, and all % are Wt. %. Viscosity is as measured at 25° C. "Me" means "methyl".

Practical Example 1

Figure 4:
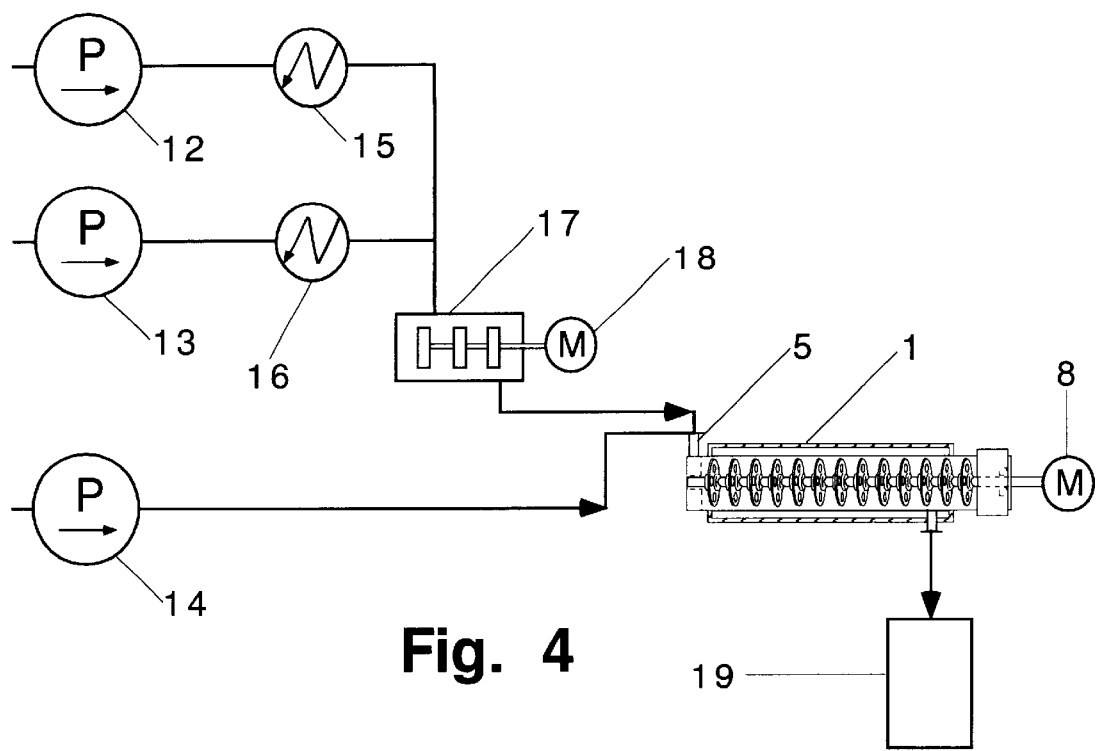
FIG. 4 is a schematic illustrating tubular reactor 1 and peripheral devices used in accordance with processes described in Practical Examples 1 and 3.

A tubular reactor 1 as shown in FIG. 4 was loaded with the following components: a copolymer of methylhydrogensiloxane and dimethylsiloxane having both molecular terminals capped with trimethylsiloxy groups represented by the following average formula $Me_3SiO(Me_2SiO)_7$ $(MeHSiO)_3SiMe_3$ and polyoxyethylene represented by the following formula $HO(CH_2CH_2O)_{12}CH_2CH=CH_2$. The first component was heated by feeding it to the reactor by means of feed pump 12 connected to heat-exchanger 15, and the second component was heated by feeding it to the reactor by means of feed pump 13 connected to heat-exchanger 16. After being mixed in dynamic mixer 17, both components were supplied to tubular reactor 1 in a continuous manner through raw-material feed port 5 located in the front part of reactor 1. The aforementioned copolymer and the polyether were introduced in a weight ratio of 3:7. Total feed rates are shown in Table 1. At the same time, tubular reactor 1 was continuously fed with a catalyst in the form of a complex of chloroplatinic acid and 1,3-divinyltetramethyldisiloxane (with concentration of metallic platinum in the reaction liquid equal to 20 ppm) by means of feed pump 14 through raw-material feed port 5. As the components were fed into the reactor, the hydrosilylation reaction was initiated. Temperatures within reactor 1 in the vicinity of feed port 5 are shown in Table 1. Tubular reactor 1 had an inner diameter of 50 mm and a length of 1000 mm and had positioned therein rotary shaft 4 having a length of 1000 mm and supporting thereon 33 disks having a 1 mm thickness and 48 mm diameter. Shaft 4 was rotated at either 100 rpm or 300 rpm as indicated in Table 1. The cylinder part of tubular reactor 1 was enclosed in a heating jacket containing a heating medium at a temperature adjusted to 120° C. After the residence time indicated in Table 1, the liquid reaction product was continuously removed from the reactor through unloading port 6 into receiving container 19. The obtained liquid reaction product was analyzed using an infrared spectrophotometer and an NMR analyzer. The results of the analysis confirmed that samples from No. 1 to No. 5 comprised methylpolysiloxanes essentially free of SiH groups, modified with a polyoxyethylene, and represented by average formula (1)

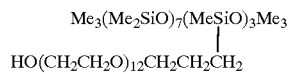

Reaction conditions and appearance of the reaction product are shown in Table 1.

TABLE 1

| Sample No. | Feed rate (kg/hr) | Frequency of rotation (rpm) | Raw material temperature (° C.) | Heating medium temperature (° C.) | Residence time (min.) | Appearance |
|---|---|---|---|---|---|---|
| 1 | 10 | 100 | 140 | 120 | 12 | Slightly yellow, transparent |
| 2 | 10 | 300 | 140 | 120 | 6 | Slightly yellow, transparent |
| 3 | 20 | 300 | 100 | 120 | 6 | Slightly yellow, transparent |
| 4 | 30 | 300 | 100 | 120 | 4 | Slightly yellow, transparent |
| 5 | 40 | 300 | 100 | 120 | 3 | Whitened |

It can be seen from Table 1 that at the feed rate of 30 kg/hr the hydrosilylation reaction can be completed successfully in the shortest time period of 4 min.

Practical Example 2

Figure 5:
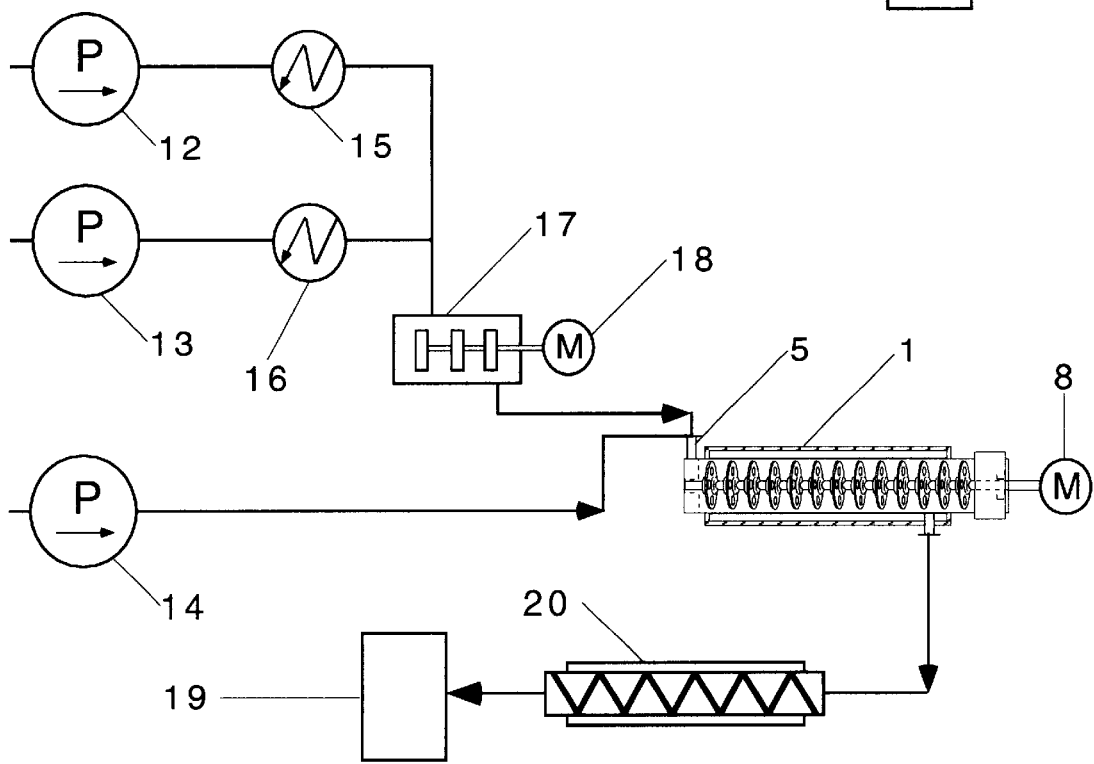
FIG. 5 is a schematic illustrating tubular reactor 1 and peripheral devices used in accordance with processes described in Practical Example 2.

The same raw material components as in Practical Example 1 in the same proportions as in Practical Example 1 were reacted in the same reactor 1 but with a static reactor 20 (with a 25 mm inner diameter, 3 m length, 1.5 liter capacity, and containing 60 elements) installed in a downstream position of reactor 1 (see FIG. 5). Reaction conditions and appearance of the reaction products are shown in Table 2.

TABLE 2

| Sample No. | Feed rate (kg/hr) | Frequency of rotation (rpm) | Raw material temperature (° C.) | Heating medium temperature (° C.) | Residence time (min.) | Appearance |
|---|---|---|---|---|---|---|
| 6 | 50 | 300 | 100 | 120 | 4 | Slightly yellow, transparent |

It can be seen from Table 2 that when static reactor 20 is installed in the position downstream of tubular reactor 1, the hydrosilylation reaction can be completed with a residence time of 4 min. at a feed rate of 50 kg/hr.

Practical Example 3

A tubular reactor 1 as shown in FIG. 4 was loaded with the following components: a copolymer of a methylhydrogensiloxane and dimethylsiloxane having both molecular terminals capped with trimethylsiloxy groups represented by the following average formula $Me_3SiO(Me_2SiO)_7(MeHSiO)_3SiMe_3$ and 1-octene represented by the following formula: $CH_3(CH_2)_5CH=CH_2$. The first component was heated by feeding it to the reactor by means of feed pump 12 through heat-exchanger 15, and the second component was heated by feeding it to the reactor by means of feed pump 13 through heat-exchanger 16. After being sufficiently mixed in dynamic mixer 17, both components were supplied to tubular reactor 1 in a continuous manner through raw-material feed port 5 located in the front part of reactor 1. The aforementioned copolymer and the 1-octene were fed in a weight ratio of 7:3. Total feed rates are shown in Table 3. At the same time, tubular reactor 1 was continuously fed with a catalyst in the form of a complex of chloroplatinic acid and 1,3-divinyltetramethyldisiloxane (with concentration of metallic platinum in the reaction liquid equal to 20 ppm) by means of feed pump 14 through raw-material feed port 5. As the components were fed into the reactor, the hydrosilylation reaction was initiated. The temperature within reactor 1 in the vicinity of feed port 5 are shown in Table 3. Tubular reactor 1 had an inner diameter of 50 mm, a length of 1000 mm, a rotary shaft 4 having a length of 1000 mm and supporting thereon 33 disks having a 1 mm thickness and 48 mm diameter. Shaft 4 was rotated at a rotation frequency of 300 rpm. The cylinder part of tubular reactor 1 was enclosed in a heating jacket with the heating medium at a temperature adjusted to 120° C. After the residence time indicated in Table 3, the liquid reaction product was continuously discharged from the reactor through discharge port 6 into receiving container 19. The obtained liquid reaction product was analyzed by infrared spectrophotometer and an NMR analyzer. The results of the analysis confirmed that sample No. 7 comprised methylpolysiloxanes essentially without SiH groups, modified with an alkyl, and represented by the following average formula (2)

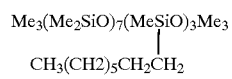

Reaction conditions and appearance of the reaction product are shown in Table 3.

TABLE 3

| Sample No. | Feed rate (kg/hr) | Frequency of rotation (rpm) | Raw material temperature (° C.) | Heating medium temperature (° C.) | Residence time (min.) | Appearance |
|---|---|---|---|---|---|---|
| 7 | 40 | 300 | 40 | 120 | 3 | Slightly yellow, transparent |

Comparative Example 1

A 4-neck flask equipped with a stirrer, a thermometer, and a reflux-cooling tube was loaded with the following components: 150 g of a copolymer of a methylhydrogensiloxane and dimethylsiloxane having both molecular terminals capped with trimethylsiloxy groups represented by the following average formula $Me_3SiO(Me_2SiO)_7(MeHSiO)_3SiMe_3$; 350 g of polyoxyethylene represented by the following formula $HO(CH_2CH_2O)_{12}CH_2CH=CH_2$; 150 g of isopropyl alcohol, and a platinum catalyst in the form of a complex of chloroplatinic acid and 1,3-divinyltetramethyldisiloxane (with concentration of metallic platinum equal to 20 ppm). A hydrosilylation reaction was then effected under reflux conditions at 85° C. Samples of the reaction liquid were taken for analysis at predetermined time intervals. The analysis showed that SiH groups disappeared 30 min. after initiation of the reaction. The stirrer was stopped, and the isopropyl alcohol was removed by heating under vacuum. The resulting product comprised 495 g of a slightly yellow transparent liquid. Since the reaction temperature did not exceed the boiling point of the isopropyl alcohol, 30 min. was required to complete the reaction, and an additional procedure was necessary for the removal of the isopropyl alcohol.

Comparative Example 2

The reaction was carried out with the same raw materials as in Comparative Example 1 using the same quantities as in Comparative Example 1, but without the addition of isopropyl alcohol. Since with quick heating it was difficult to control the reaction, the reaction was carried out for 1 hour at 80° C. The heating was then stopped, the product was held for 15 min, and heated again to 120° C. to complete the reaction. Analysis of the reaction liquid confirmed that it was essentially free of SiH. The time required for completion of the reaction was 75 min.

We claim:

1. A continuous method for performing a hydrosilylation reaction comprising effecting a hydrosilylation reaction between a liquid organosilicon compound (A) having in each molecule at least one silicon-bonded hydrogen atom and a liquid organosilicon compound (B) having in each molecule at least one aliphatic unsaturated bond in the presence of a platinum catalyst (C) continuously in a tubular reactor equipped with a stirring and plug-flow maintaining apparatus located within the reactor.

2. The method of claim 1, where the tubular reactor has a cylindrical shape and where the stirring and plug-flow maintaining apparatus located within the reactor comprises a rotating shaft with one or more disks.

3. The method of claim 2, where the disks have at least one through opening for passage of liquid.

4. The method of claim 2, where the hydrosilylation reaction is carried out while the rotating shaft rotates at a rate of from 10 rpm to 2000 rpm.

5. The method of claim 1, where the tubular reactor is cooled by a liquid coolant passed through a cooling jacket.

6. The method of claim 2, where the tubular reactor is cooled by a liquid coolant passed through a cooling jacket.

7. The method of claim 1 further comprising connecting a static reactor to the tubular reactor in a downstream position.

8. The method of claim 2 further comprising connecting a static reactor to the tubular reactor in a downstream position.

9. The method of claim 1, where components (A) and (B) are premixed before being fed to the tubular reactor.

10. The method of claim 2, where components (A) and (B) are premixed before being fed to the tubular reactor.

11. The method of claim 9, where components (A) and (B) are premixed in a dynamic mixer.

12. The method of claim 10, where components (A) and (B) are premixed in a dynamic mixer.

13. The method of claim 1, where component (A) is an organohydrogenpolysiloxane and component (B) is an alkene or a polyoxyalkylene having a terminal alkenyl group.

14. The method of claim 2, where component (A) is an organohydrogenpolysiloxane and component (B) is an alkene or a polyoxyalkylene having a terminal alkenyl group.

15. The method of claim 2, where the hydrosilylation reaction is carried out while the rotating shaft rotates at a rate of from 100 rpm to 500 rpm.

* * * * *